UNITED STATES PATENT OFFICE.

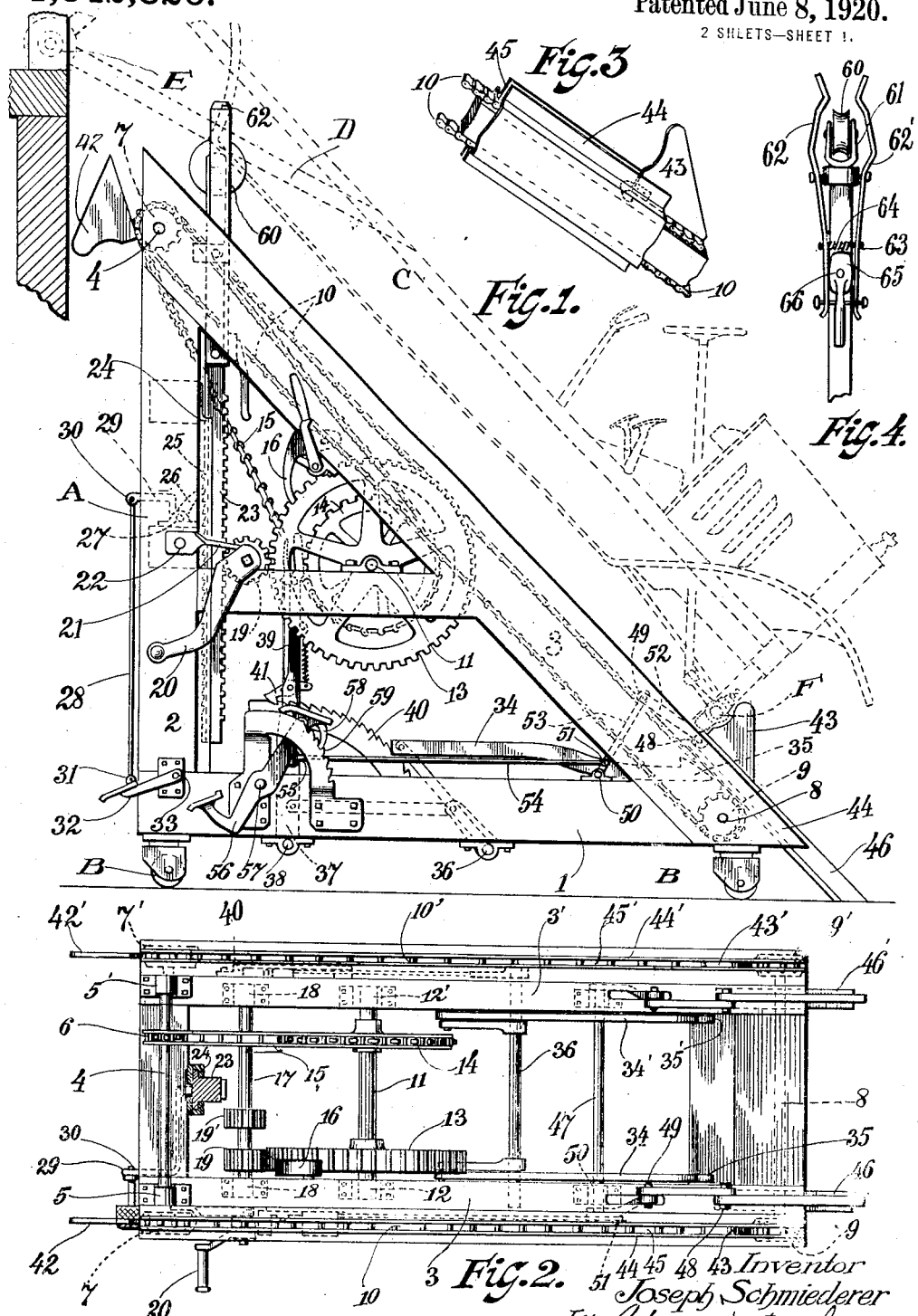

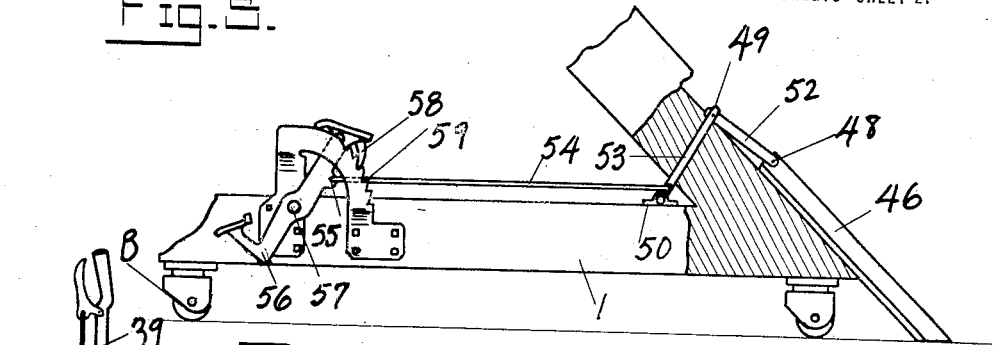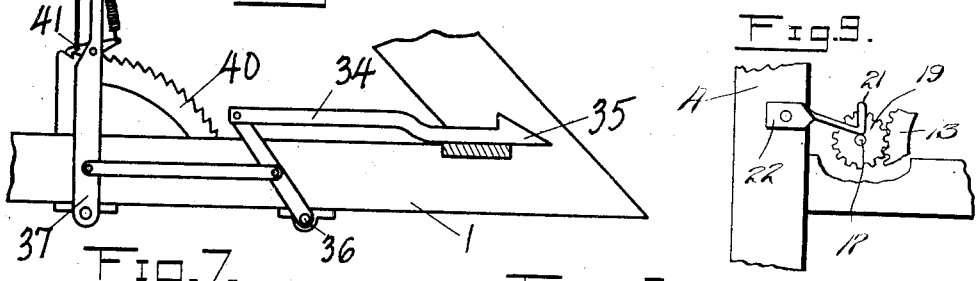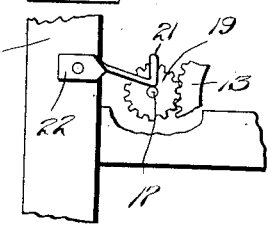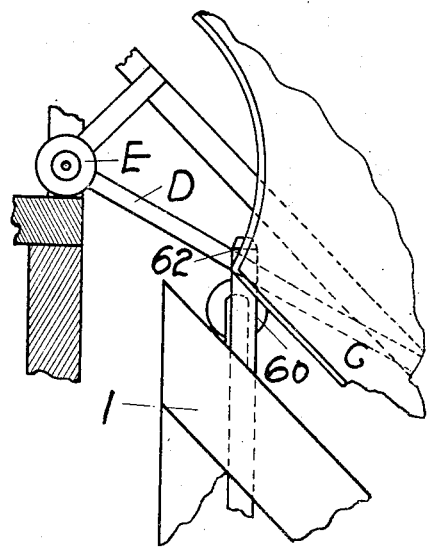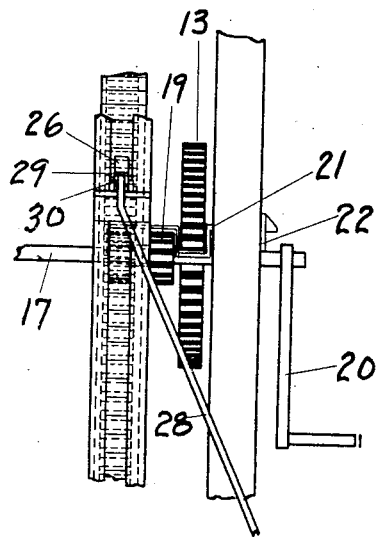

JOSEPH SCHMIEDERER, OF ST. LOUIS, MISSOURI.

LOADING AND UNLOADING DEVICE.

1,342,826.   Specification of Letters Patent.   Patented June 8, 1920.

Application filed April 15, 1918. Serial No. 228,539.

*To all whom it may concern:*

Be it known that I, JOSEPH SCHMIEDERER, a citizen of the United States, residing in the city of St. Louis, State of Missouri, have invented new and useful Improvements in Loading and Unloading Devices, of which the following is a specification, reference being had to the accompanying drawings.

This invention pertains to loading and unloading devices for the purpose of facilitating the loading or unloading of automobile chassis into and out of railroad cars. As ordinarily loaded into a railroad car, an automobile chassis is ended up against the inside of the car, the wheels being removed and the front axle resting upon the floor and the rear axle being elevated against the side of the car. This requires the work of several men and it is a quite difficult undertaking. It is equally difficult to unload the chassis from the car.

It is the purpose of this invention to provide an apparatus to position the chassis inside of a box car and properly inclined against the side thereof as such chassis are ordinarily loaded, and which said apparatus may also be used to demount the said chassis from such position for unloading the chassis from the box car.

The main object of my invention, therefore, is to produce a loading and unloading device which will enable one man alone to do the work of several men, as ordinarily required in such work.

Another object is to construct such device in a practical, simple and efficient form, best adapted for the purpose intended.

With these objects in view, attention is called to the accompanying drawing, forming a part of this specification, and wherein—

Figure 1 represents a side elevation of my device with a chassis represented thereupon in dotted lines and ready to be trucked into place within the car.

Fig. 2 is a plan view.

Fig. 3 is a detail of the mechanism of one of the traveling hooks.

Fig. 4 is a detail of the mechanism of the upper end of the traveling rack with its roller and clamp.

Fig. 5 is a detail of the mechanism controlling and operating the extension rails.

Fig. 6 is a detail of the mechanism controlling and operating the sliding arms and hooks.

Fig. 7 is a detail showing how the rear end of the chassis is engaged by the clamps at the upper end of the traveling rack and elevated so as to rest against the side of a car.

Fig. 8 is a detail of a portion of the gear mechanism.

Fig. 9 is a detail showing the method of pivoting a locking sleeve or loop so as to hold the gears in mesh.

Referring more particularly to the drawings, my invention consists of a supporting frame A substantially triangular on a side elevation, and said frame being mounted upon a plurality of rollers B. The loader is, as stated, substantially triangular on a side elevation, such elevation resembling a right angled triangle with the rollers B located beneath one side 1 of the triangular frame, while the other side 2 extends vertically from the side 1 and the side 3 corresponds to the hypotenuse of the triangle. The side members 1, 2 and 3 have each its counterpart represented by 1', 2' and 3', and same being supported by the frame work parallel to and in spaced relation to the side members 1, 2 and 3. At the top of the frame A so formed is mounted the shaft 4 journaled and boxed in the frame at the points 5 and 5'. A sprocket 6 is mounted rigidly upon the shaft 4 at a medial point on said shaft, and other sprockets 7 and 7' are rigidly mounted at either end of the shaft 4. A similar shaft 8 is mounted at the lower and forward end of the frame and carries rigidly mounted sprockets 9 and 9' located in alinement with the sprockets 7 and 7'. Chain belts 10 and 10' pass over and around the sprockets 7 and 9, and 7' and 9'. Near the center of the frame A is mounted the shaft 11, the same being journaled and boxed in the frame at the points 12 and 12'. Rigidly mounted upon the shaft 11 are the large gear wheel 13 and sprocket wheel 14 located toward opposite ends of said shaft with the sprocket 14 in alinement with the sprocket 6. The chain belt 15 passes over and around the sprockets 14 and 6. A pawl 16 is mounted in the frame over the gear wheel 13 for the purpose of locking said gear wheel against retrograde motion. A crank axle 17 is journaled and boxed in the frame at the points 18 and 18′, the journals of said crank axle being sufficiently long as to permit said crank axle to be shifted longitudinally within its bearings for a purpose hereinafter to be described.

Near the periphery of the gear wheel 13 and rigidly mounted upon the crank axle 17 are the two relatively small gear wheels 19 and 19′. A crank 20 is rigidly joined to the outer end of the crank axle 17. So arranged, the crank axle 17 may be shifted back and forth within its bearings so that said gear wheel 19 may be thrown into or out of mesh with the gear wheel 13, as desired. A locking sleeve 21 is pivoted to the frame at the point 22, and the forward end thereof is curved downwardly and adapted to fall over the exposed portion of the journal at that end of the crank axle 17 so as to lock gear 19 in mesh with the gear 13. When it is desired to throw the gear 19 out of mesh with the gear 13, said locking sleeve 21 is raised for that purpose. The traveling rack 23 is slidingly mounted within its trackway 24, said trackway being vertically and rigidly mounted along a medial line upon the inner side of the frame A. The gear 19′ is adapted to mesh with the traveling rack 23 by longitudinally shifting the crank axle 17 within its bearings, thereby at the same time throwing the gear 19 out of mesh with the gear 13. In other words, the gears 19 and 19′ are so located and positioned upon the crank axle 17 in such relation to the traveling rack 23 and the gear 13 that when the gear 19 is in mesh with the gear 13, the gear 19′ will be out of mesh with the traveling rack 23, but when the gear 19′ is shifted into mesh with the traveling rack 23, the gear 19 will be drawn out of mesh with the gear 13. The traveling rack 23 is formed with a rack of ratchet teeth 25 along its posterior side and a pawl 26 pivoted at 27 to the frame A is adapted to play into said ratchet teeth and lock the rack 23 against downward movement. A connecting link 28 extends from the heel 29 of the pawl 26, being pivoted at the point 30, and the lower end of said link 28 being pivoted at the point 31 to the foot lever 32 pivoted in the frame A at the point 33. Pressure upon this foot lever 32 is adapted to release the pawl 26, thereby permitting the downward motion of the traveling rack 23. Slidingly mounted in connection with the side member 1 and 1′ are the sliding hook arms 34 and 34′ carrying the hooks 35 and 35′ at their outer extremity. These sliding hook arms are joined rigidly together by means of the cross bar 36 and they are controlled in their joint forward and backward motion by means of a lever 37 pivoted at 38 in the base of the frame A, and ending upwardly in the handle 39. This lever works in connection with a ratchet 40 mounted upon the frame A at the side of the lever and the lever 37 may be locked at any point by means of the pawl 41, which plays into the ratchet 40. By releasing the pawl 41, and moving the lever 37 forward, the sliding hook arms 34 and 34′ are projected forwardly beyond the face of the frame A; vice versa, by throwing the lever 37 backwardly the sliding hook arms 34 and 34′ are drawn back. Four traveling hooks 42 and 42′, and 43 and 43′ are hinged in pairs to the chain belts 10 and 10′, said pairs being located at equidistant points around said chain belts; so that when one pair of said traveling hooks as 42 and 42′ reach the sprockets 7 and 7′, the other pair of said traveling hooks as 43 and 43′ would reach the sprockets 9 and 9′ in their course.

Slotted guide-ways 44 and 44′ are mounted along the upper faces of the sides 3 and 3′ immediately over the chain belts 10 and 10′ and the traveling hooks 42 and 42′, and 43 and 43′ project upwardly through the slots 45 and 45′ as they pass and follow the course of the chain belts 10 and 10′. Extension rails 46 and 46′ are slidingly mounted in connection with the guide-ways 44 and 44′ and adapted to slide up and down so as to form an extension of said guide-ways as required. A cross bar 47 connects the two extension rails 46 and 46′. Pivoted at the points 48, 49, 50 and 51 are the links 52, 53 and 54, the latter being connected at the point 55 with the lever 56, said lever being pivoted at 57 to the frame A. A pawl 58 and ratchet 59 controls the movement of said lever 56. By projecting said lever 56 forwardly the extension rails 46 and 46′ are caused to descend, and by drawing said lever 56 backwardly, said extension rails are caused to be elevated, and these rails may be locked in any position by means of the pawl 58 and ratchet 59. Upon the upper extremity of the traveling rack 23 is mounted a roller 60 journaled within the fork 61 and to the sides of said roller are located the clamp jaws 62 and 62′ loosely bolted at the point 63 to the upper end of said traveling rack. A spring 64 normally tends to throw said jaws open and a cam lever 65 pivoted at 66 operates to force said jaws together by merely turning the handle of said cam lever sidewise.

As used in this specification, the word "loading" means the ending up of the chassis within the car itself and against the side of the car, so that one end is positioned on the floor, while the other end is positioned against the side of the car; while the word "unloading" means the taking down of the chassis from this ended up position and placing same again horizontally upon the floor of the car.

In the operation of loading a chassis, the rear end of the chassis C is rolled squarely up against my loader. The gears 19 and 13 being placed in mesh, the crank 20 is then revolved clockwise, the effect whereof is to revolve the chain belts 10 and 10', and to cause the traveling hooks 42 and 42' to pass up beneath and engage from the under side thereof the rear axle E of the chassis C. As the rear end of the chassis C is elevated from the floor, the rear wheels are removed. Continuing the revolution of the crank 20, the chassis C is drawn on upwardly along the guide-ways 44 and 44' until it reaches the point where the drive shaft D is immediately over the roller 60. The gear 19' is then thrown into mesh with the traveling rack 23, and by revolving the crank 20 clockwise, the rack 23 is elevated, so that the roller 60 bears upwardly against the drive shaft D. The loader being of necessity shorter than the chassis, the front axle F of the chassis will be found to stand at a slight distance from the guide-ways 44 and 44'. The lever 37 is now thrown forwardly whereby the sliding hook arms 34 and 34' are projected outwardly immediately beneath the front axle F and the hooks 35 and 35' are caused to engage with said front axle at the under side thereof. By drawing the lever 37 backward, the axle F is drawn on to the guide-ways 44 and 44'. The gear 19 is shifted back into mesh with the gear 13. The crank 20 is again revolved, causing the traveling hooks 43 and 43' to press up under the axle F. The revolution of the crank 20 being continued, the entire chassis C is elevated and the front wheels may now be removed. The clamp jaws 62 and 62' are now gripped against the drive shaft by turning the cam lever 65. The sliding hook arms 34 and 34' are now drawn back within the frame by continued backward movement of the lever 37. The gear 19' is now again thrown into mesh with the traveling rack 23, and the crank 20 being again revolved, the rack 23 and the rear end of the chassis C is elevated to the desired point. The loader is now backed into the desired position within the car, and being backed up against one side of the car, the rear end of the chassis comes into contact with that side. The clamp jaws 62 and 62' are now released. The crank is now operated contra-clockwise, whereby the rack 23 is lowered free of the chassis, leaving the rear end of the chassis supported by the side of the car. The extension rails 46 and 46' are projected toward the floor by operation of the lever 56 as before described. The gear 19 is now placed in mesh with the gear 13, and the crank 20 being again revolved contra-clockwise, the traveling hooks 43 and 43' are caused to descend, whereby the front end of the chassis C is gradually lowered toward the floor, and the loader being at the same time withdrawn, the chassis is finally supported by the floor and one side of the car and the loader is cleared. To unload a chassis from a car, the reverse of the preceding operations are employed.

The clamp jaws 62 and 62' at first only loosely engage the drive shaft D, the drive shaft itself resting upon the roller 60. Then by raising the loop or sleeve 21 and shifting the gear 19 back into mesh with the gear 13 by shifting the crank axle 17 and crank 20 to the right, and then again dropping the loop or sleeve 21 down over the gear 19 to hold same in fixed mesh with the gear 13, and by rotating the crank 20 clockwise, the chain belts 10 and 10' are again revolved, causing the traveling hooks 43 and 43' to press upwardly beneath the front axle F, thus forcing the chassis on up the guide-ways 44 and 44', the drive shaft D meantime sliding over the roller 60 between the clamp jaws 62 and 62'. Now by again raising the loop or sleeve 21 from the gear 19, the crank axle 17 may be again shifted to the left, and the gear 19' thrown into mesh with the rack 23, and by again rotating the crank 20 clockwise, the roller 60 again forces upwardly the rear end of the chassis elevating it a degree further. Thus by alternating this action as described, the chassis is successively worked upwardly and backwardly along the guide-ways 44 and 44'. Then as the rear end of the chassis becomes extended sufficiently far over the back of the device, the entire machine is backed up against the side of the car as indicated in Fig. 1 of the drawing, so that the rear axle may be positioned upon the plate of the side of the car, as indicated, or may be merely positioned against the face of the side of the car itself. Then by lowering the rack 23 and lowering the traveling hooks 43 and 43', both of which operations are accomplished by alternately throwing the gear 19' in mesh with the rack 23, and turning the crank 20 anti-clockwise, and then by throwing the gear 19 in mesh with the gear 13, and turning the crank 20 anti-clockwise, and by gradually withdrawing the entire machine from beneath the chassis, allowing the front axle to slide down the guide-ways 44 and 44', the front axle of the chassis is positioned upon the floor of the car. The loader is then withdrawn entirely from beneath the chassis. The function of the sleeve or loop 21 is merely to drop down over the gear 19 to hold same in mesh with the gear 13. The device is, of course, constructed small enough and short enough that it may be readily rolled from beneath the chassis after the latter is set up or ended up against the side of the car.

While I have herein described and set forth a certain specific manner and method of constructing the elements of my invention, it is understood that I may vary from the same in minor details, not departing from the spirit of the invention, so as best to construct a practical device for the purpose intended.

What I claim to be new and patentable is:

1. A loading truck for chassis, comprising a supporting frame substantially right angled on its side elevation; carrying rollers for the same; horizontal shafts journaled transversely at the upper and lower ends of the sloping side of the frame; alined elevator sprockets rigidly mounted at the ends of the shafts; and upper transmission sprocket rigidly mounted at a medial point on the upper shaft; elevator chain belts passing over and connecting the alined sprockets; a plurality of elevator hooks hinged to the chain belts; a drive shaft journaled in the frame; a large drive gear and drive sprocket rigidly mounted thereon, the latter in alinement with said transmission sprocket on the upper shaft; a drive chain passing over and connecting said drive and transmission sprockets; a locking pawl for said drive gear; a crank axle slidingly journaled in the frame, spaced from and parallel to said drive shaft; a relatively small drive gear and small rack gear rigidly mounted on said crank axle, the small drive gear being adapted to mesh with said large drive gear when the crank axle is drawn fully over to that side; a crank rigidly joined to one end of said crank axle; a vertical guide-way located in the back of the frame; a vertical traveling rack and ratchet slidingly mounted in said guide-way, the rack being adapted to mesh with the small rack gear on the crank axle when the latter is thrown fully over to that side; and a locking pawl for said ratchet.

2. A loading truck for chassis, comprising a supporting frame substantially right angled on its side elevation; carrying rollers for the same; horizontal shafts journaled transversely at the upper and lower ends of the sloping side of the frame; alined elevator sprockets rigidly mounted at the ends of the shafts; an upper transmission sprocket rigidly mounted at a medial point on the upper shaft; elevator chain belts passing over and connecting the alined sprockets; a plurality of elevator hooks hinged to the chain belts; a drive shaft journaled in the frame; a large drive gear and drive sprocket rigidly mounted thereon, the latter in alinement with said transmission sprocket on the upper shaft; a drive chain passing over and connecting said drive and transmission sprockets; a locking pawl for said drive gear; a crank axle slidingly journaled in the frame, spaced from and parallel to said drive shaft; a relatively small drive gear and small rack gear rigidly mounted on said crank axle, the small drive gear being adapted to mesh with said large drive gear when the crank axle is drawn fully over to that side; a crank rigidly joined to one end of said crank axle; a vertical guide-way located in the back of the frame; a vertical traveling rack and ratchet slidingly mounted in said guide-way, the rack being adapted to mesh with the small rack gear on the crank axle when the latter is thrown fully over to that side; a locking pawl for said ratchet; and extension rails slidingly mounted in connection with the frame and adapted to be thrown down to form a continuation of the slope of the frame to the floor.

3. A loading truck for chassis, comprising a supporting frame substantially right angled on its side elevation; carrying rollers for the same; horizontal shafts journaled transversely at the upper and lower ends of the sloping side of the frame; alined elevator sprockets rigidly mounted at the ends of the shafts: an upper transmission sprocket rigidly mounted at a medial point on the upper shaft; elevator chain belts passing over and connecting the alined sprockets; a plurality of elevator hooks hinged to the chain belts; a drive shaft journaled in the frame; a large drive gear and drive sprocket rigidly mounted thereon, the latter in alinement with said transmission sprocket on the upper shaft; a drive chain passing over and connecting said drive and transmission sprockets; a locking pawl for said drive gear; a crank axle slidingly journaled in the frame, spaced from and parallel to said drive shaft; a relatively small drive gear and small rack gear rigidly mounted on said crank axle, the small drive gear being adapted to mesh with said large drive gear when the crank axle is drawn fully over to that side; a crank rigidly joined to one end of said crank axle; a vertical guide-way located in the back of the frame; a vertical traveling rack and ratchet slidingly mounted in said guide-way, the rack being adapted to mesh with the small rack gear on the crank axle when the latter is thrown fully over to that side; a locking pawl for said ratchet; extension rails slidingly mounted in connection with the frame and adapted to be thrown down to form a continuation of the slope of the frame to the floor; and hook arms slidingly mounted in connection with the frame and adapted to be extended outward to engage an axle of a chassis.

4. A loading truck for chassis, comprising a supporting frame substantially right angled on its side elevation; carrying rollers for the same; horizontal shafts journaled transversely at the upper and lower ends of the sloping side of the frame; alined elevator sprockets rigidly mounted at the ends of the shafts; an upper transmission sprocket rigidly mounted at a medial point on the upper shaft; elevator chain belts passing over and connecting the alined sprockets; a plurality of elevator hooks hinged to the chain belts; a drive shaft journaled in the frame; a large drive gear and drive sprocket rigidly mounted thereon, the latter in alinement with said transmission sprocket on the upper shaft; a drive chain passing over and connecting said drive and transmission sprockets; a locking pawl for said drive gear; a crank axle slidingly journaled in the frame, spaced from and parallel to said drive shaft; a relatively small drive gear and small rack gear rigidly mounted on said crank axle, the small drive gear being adapted to mesh with said large drive gear when the crank axle is drawn fully over to that side; a crank rigidly joined to one end of said crank axle; a vertical guide-way located in the back of the frame; a vertical traveling rack and ratchet slidingly mounted in said guide-way, the rack being adapted to mesh with the small rack gear on the crank axle when the latter is thrown fully over to that side; a locking pawl for said ratchets; extension rails slidingly mounted in connection with the frame and adapted to be thrown down to form a continuation of the slope of the frame to the floor; hook arms slidingly mounted in connection with the frame and adapted to be extended outward to engage an axle of a chassis; and a clamping mechanism located at the upper end of the traveling rack, adapted to engage and hold a portion of the chassis being loaded.

5. A loader for chassis, comprising a sloping frame carried on rollers; longitudinal guide-ways formed along the face of the slope; horizontal transverse shafts journaled in the frame, one at the top and one at the bottom of the slope; sprockets rigidly mounted at the ends of the shafts and in alinement with said guide-ways; elevator chain belts passing over said guide-ways and sprockets, said belts carrying a plurality of traveling elevator hooks upon their upper surfaces; and means for propelling said elevator chains along their guide-ways and locking same.

6. A loader for chassis, comprising a sloping frame carried on rollers; longitudinal guide-ways formed along the face of the slope; horizontal transverse shafts journaled in the frame, one at the top and one at the bottom of the slope; sprockets rigidly mounted at the ends of the shafts and in alinement with said guide-ways; elevator chain belts passing over said guide-ways and sprockets, said belts carrying a plurality of traveling elevator hooks upon their upper surfaces; means for propelling said elevator chains along their guide-ways and locking same; a vertical rack slidingly mounted in the rear of the frame; a holding element located at the upper end thereof; and means for raising, lowering and locking said rack, as desired.

7. A loader for chassis, comprising a sloping frame carried on rollers; longitudinal guide-ways formed along the face of the slope; horizontal transverse shafts journaled in the frame, one at the top and one at the bottom of the slope; sprockets rigidly mounted at the ends of the shafts and in alinement with said guide-ways; elevator chain belts passing over said guide-ways and sprockets, said belts carrying a plurality of traveling elevator hooks upon their upper surfaces; means for propelling said elevator chains along their guide-ways and locking same; a vertical rack slidingly mounted in the rear of the frame; a holding element located at the upper end thereof; means for raising, lowering and locking said rack, as desired; extension rails slidingly mounted in connection with, and forming a continuation of the slope of the frame; means for extending and withdrawing said extension rails; extensible hook arms slidingly mounted in connection with, and moving parallel to, the base of the frame; and means for extending and withdrawing said hook arms.

8. A loader for chassis, comprising a frame and rollers therefor; sloping guide-ways supported by the frame; a shaft at the top and one at the bottom of the guide-ways; sprockets rigidly mounted thereon in alinement with the guide-ways; elevator chain belts passing over said guide-ways and sprockets; two elevator hooks hinged outwardly to each elevator chain at equidistant points; means for propelling and locking said chains along the guide-ways; a vertical rack slidingly mounted in the rear of the frame; a clamp at the upper end of the vertical rack; means for raising, lowering and locking the rack; slidable extensions for said guide-rails; and extensible hook arms adapted to be extended beyond the face of the guide ways.

JOSEPH SCHMIEDERER.

Witnesses:
M. PAYER,
J. YOUNG.